United States Patent
Fine et al.

(10) Patent No.: US 7,769,651 B2
(45) Date of Patent: Aug. 3, 2010

(54) METHOD AND SYSTEM OF PROCESSING BILLING DATA

(75) Inventors: Jack Fine, Benicia, CA (US); Euly LeGro, Benicia, CA (US); Mehran Habibl, Pleasanton, CA (US); Kin Kwok Chan, Danville, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 717 days.

(21) Appl. No.: 10/404,000

(22) Filed: Mar. 31, 2003

(65) Prior Publication Data

US 2004/0193516 A1 Sep. 30, 2004

(51) Int. Cl.
*G06Q 40/00* (2006.01)

(52) U.S. Cl. ............ 705/35; 379/114.03; 379/114.04; 379/116; 455/406; 705/7; 705/34; 705/40

(58) Field of Classification Search ............ 379/114.03, 379/114.04, 116; 455/406; 705/7, 34, 40
See application file for complete search history.

(56) References Cited

U.S. PATENT DOCUMENTS

| | | | |
|---|---|---|---|
| 5,659,601 A | | 8/1997 | Cheslog |
| 5,995,946 A | * | 11/1999 | Auzenne et al. ............ 705/34 |
| 6,032,132 A | * | 2/2000 | Nelson ..................... 705/34 |
| 6,035,285 A | * | 3/2000 | Schlect et al. ............. 705/30 |
| 6,266,401 B1 | * | 7/2001 | Marchbanks et al. ....... 379/116 |
| RE37,856 E | * | 9/2002 | Browne ..................... 379/28 |
| 6,553,107 B2 | * | 4/2003 | Jarvi et al. ............ 379/114.03 |
| 6,862,573 B2 | * | 3/2005 | Kendall et al. ................ 705/7 |
| 6,917,798 B1 | * | 7/2005 | Hake et al. ................. 455/406 |
| 7,085,360 B1 | * | 8/2006 | Sprouse .............. 379/114.04 |
| 2002/0026394 A1 | * | 2/2002 | Savage et al. ................ 705/34 |
| 2002/0082991 A1 | * | 6/2002 | Friedman et al. ............. 705/40 |
| 2002/0111889 A1 | * | 8/2002 | Buxton et al. ................ 705/35 |
| 2003/0036918 A1 | * | 2/2003 | Pintsov ....................... 705/1 |
| 2003/0120594 A1 | * | 6/2003 | Shaginaw et al. ............ 705/40 |

* cited by examiner

*Primary Examiner*—Ella Colbert
*Assistant Examiner*—Sanjeev Malhotra
(74) *Attorney, Agent, or Firm*—Toler Law Group

(57) ABSTRACT

A billing data extraction and processing system for use in connection with a first billing system and a second billing system is disclosed. The billing data extraction and processing system includes a first input to receive rated billing data from the first billing system, a second input to receive rated billing data from the second billing system, and a data processing module, the data processing module responsive to the first input and to the second input, the data processing module processing the aggregated data extracted from at least one of the first and the second billing system. A first set of aggregated billing data at a first point in a billing period of the first billing system and a second set of aggregated billing data at a second point in the billing period of the first billing system are extracted and received at the first input. A first set of aggregated billing data at a first point in a billing period of the second system and a second set of aggregated billing data at a second point in the billing period of the second billing system are extracted and received at the second input.

16 Claims, 6 Drawing Sheets

METHOD AND SYSTEM OF PROCESSING BILLING DATA

BACKGROUND

1. Field of the Invention

The present disclosure relates generally to a method and system of processing billing data.

2. Description of the Related Art

Billing data for complex and distributed systems, such as telephony systems, is used to generate a large number of bills for individual subscribers. Automated bill generation systems have been used in an attempt to reduce billing errors and to provide improved customer service. While such billing automation systems are an improvement over manual billing systems, due to the large number of bills involved, errors in billing still occur, leading to additional subscriber service costs and potential loss of customers. It would be desirable if error-prone batches of automatically generated bills could be identified in an attempt to prevent errors before the generated bills reach end customers.

Accordingly, there is a need for an enhanced method and system for processing billing data.

SUMMARY

In a particular embodiment, a method of processing rated billing data during a billing period is disclosed. The method comprises extracting a first set of rated aggregated billing data at a first point within the billing period of a bill processing system for a billing round, the billing round associated with a plurality of bills; extracting a second set of rated aggregated billing data at a second point within the billing period of the bill processing system for the billing round; and processing the first set of rated aggregated billing data and the second set of rated aggregated billing data.

In another embodiment, a billing data extraction and processing system for use in connection with a first billing system and a second billing system is disclosed. The billing data extraction and processing system includes a first input to receive rated billing data from the first billing system, a second input to receive rated billing data from the second billing system, and a data processing module, the data processing module responsive to the first input and to the second input, the data processing module processing the aggregated data extracted from at least one of the first and the second billing system. A first set of aggregated billing data at a first point in a billing period of the first billing system and a second set of aggregated billing data at a second point in the billing period of the first billing system are extracted and received at the first input. A first set of aggregated billing data at a first point in a billing period of the second system and a second set of aggregated billing data at a second point in the billing period of the second billing system are extracted and received at the second input.

In another embodiment, a billing data extraction and processing system is disclosed that includes a data extraction module to receive a first set of extracted billing data and a second set of extracted billing data. The first set of extracted billing data is extracted from a first point in a billing period of a bill processing system for a billing round associated with a plurality of bills. The second set of extracted billing data is extracted at a second point in the billing period of the bill processing system for the billing round. The billing data extraction and processing system further includes a data processor responsive to the data extraction module to process the first set of extracted billing data and the second set of extracted billing data.

BRIEF DESCRIPTION OF THE DRAWINGS

The use of the same reference symbols in different drawings indicates similar or identical items.

DETAILED DESCRIPTION OF THE DRAWINGS

Figure 1:
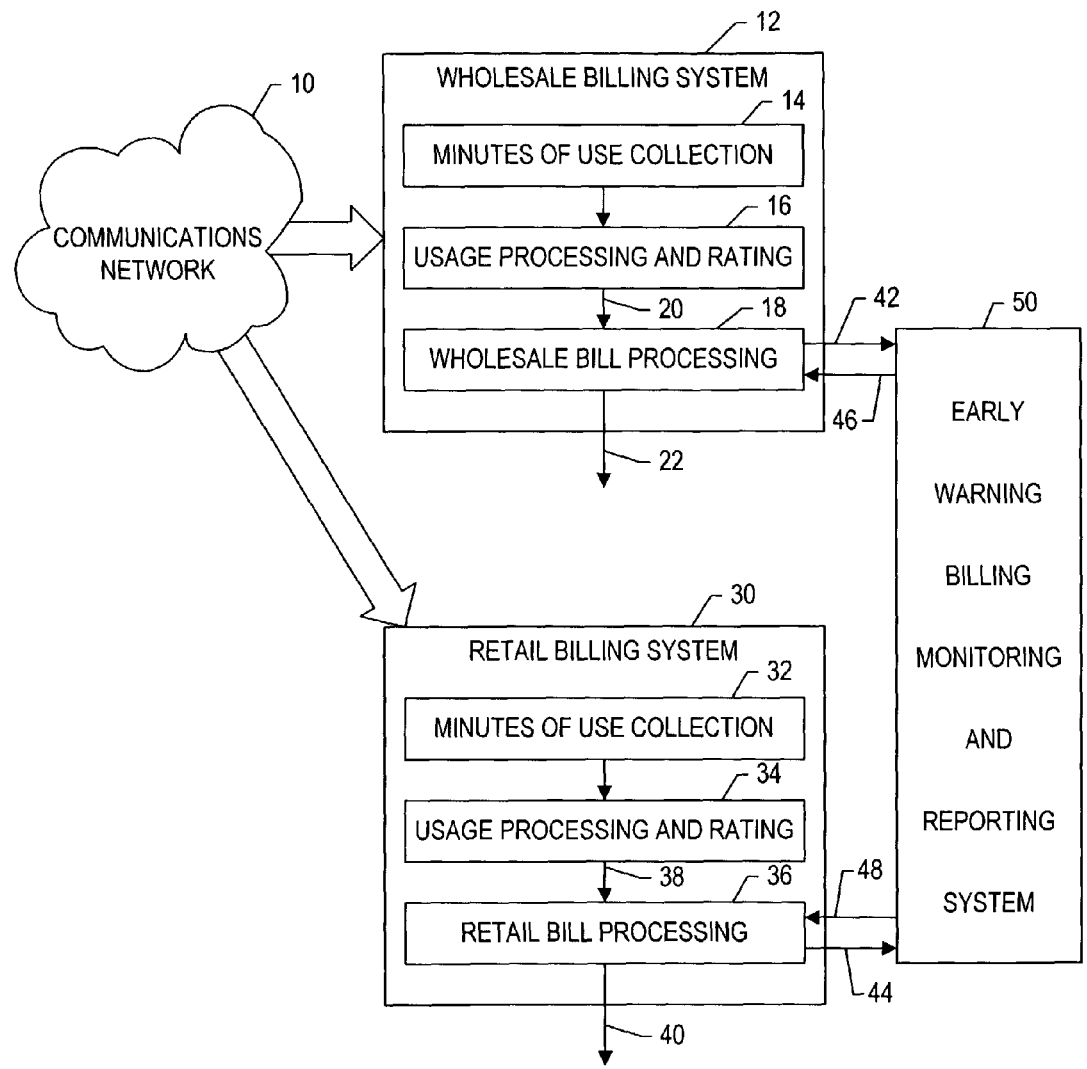
FIG. 1 is a block diagram that illustrates a system having an early warning billing, monitoring, and reporting system.

Referring to FIG. 1, an early warning billing, monitoring, and reporting system 50 is illustrated in the context of an overall billing system and communications network. The early warning billing, monitoring, and reporting system 50 is coupled to a first billing system, such as the wholesale billing system 12 and to a second billing system, such as the retail billing system 30. The wholesale billing system 12 and the retail billing system 30 are each responsive to usage and billing data reported from a communications network 10. The wholesale billing system 12 collects minutes-of-use data 14, usage processing and rating data 16, and performs wholesale bill processing 18. The wholesale bill processing module 18 produces an aggregate bill 22 that may be distributed to various customers for payment. The wholesale bill processing module 18 also produces rated billing data that is input to the early warning billing, monitoring, and reporting system 50. The retail billing system 30 similarly has a minutes-of-use collection module 32, usage processing and rating module 34, and a retail bill processing module 36.

The retail bill processing module 36 creates retail bills 40 which are distributed to customers for payment. Retail bill processing module 36 produces rated retail billing data 44 which is fed to a second input of the early warning billing, monitoring, and reporting system 50. The early warning billing, monitoring, and reporting system 50, in response to the rated billing data received from the wholesale billing system 12 and from the retail billing system 30, processes aggregated billing data and generates alerts that are fed back to the respective billing systems. For example, command signal 46 is fed to wholesale billing system 12 and command signal 48 is sent to retail billing system 30.

Figure 2:
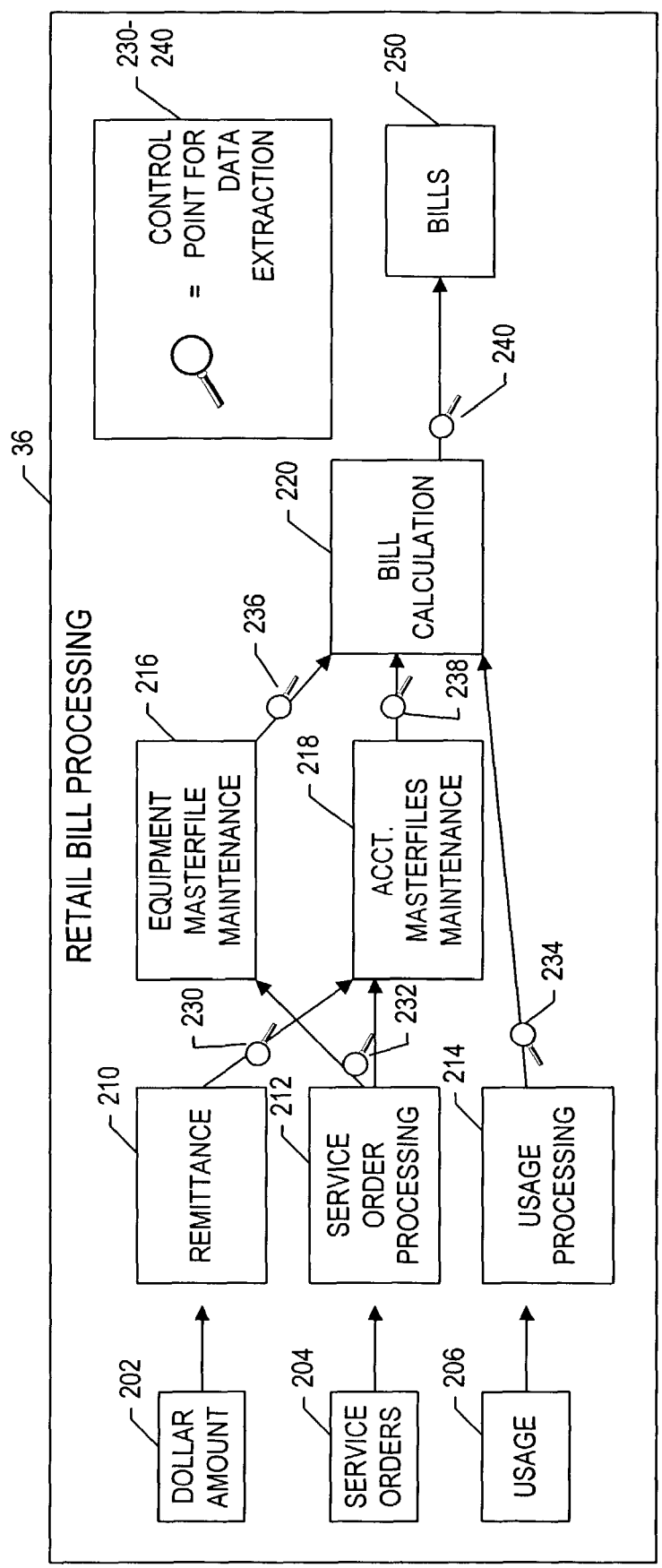
FIG. 2 is a block diagram that illustrates further details of an illustrative retail bill processing system.

Referring to FIG. 2, an illustrative embodiment of the retail bill processing module 36 is shown. The bill processing module 36 includes a calculated dollar amount input 202, service orders 204, and usage data 206. The retail bill processing module 36 also includes a remittance module 210, service order processing module 212, and usage processing 214. The remittance module 210 receives the dollar amount 202. The service order processing module 212 receives service orders 204, and usage processing module 214 receives usage data 206. The retail bill processing module 36 also includes equipment master file maintenance module 216 and account master files maintenance module 218. The equipment master file maintenance module 216 receives service orders that have been processed by the service order processing module 212, and the account master file maintenance module 218 receives both remittance output from the remittance module 210 and service orders that have been processed by the service order processing module 212. The outputs from the equipment master file maintenance module 216 and the account master file maintenance module 218 are fed to bill calculation module 220. The bill calculation module 220 is also responsive to output from usage processing module 214.

Bill calculation module 220 produces a calculated bill 250 ready for distribution. At various points in the disclosed bill processing cycle, data may be extracted. An example of illustrative data extraction points includes a first data extraction point 230, a second data extraction point 232, a third data extraction point 234, a fourth data extraction point 236, a fifth data extraction point 238, and a sixth data extraction point 240. While many different data extraction points have been illustrated, it should be understood that additional data extraction points may be added and that not all of the identified data extraction points are necessarily used in a particular application.

Figure 3:
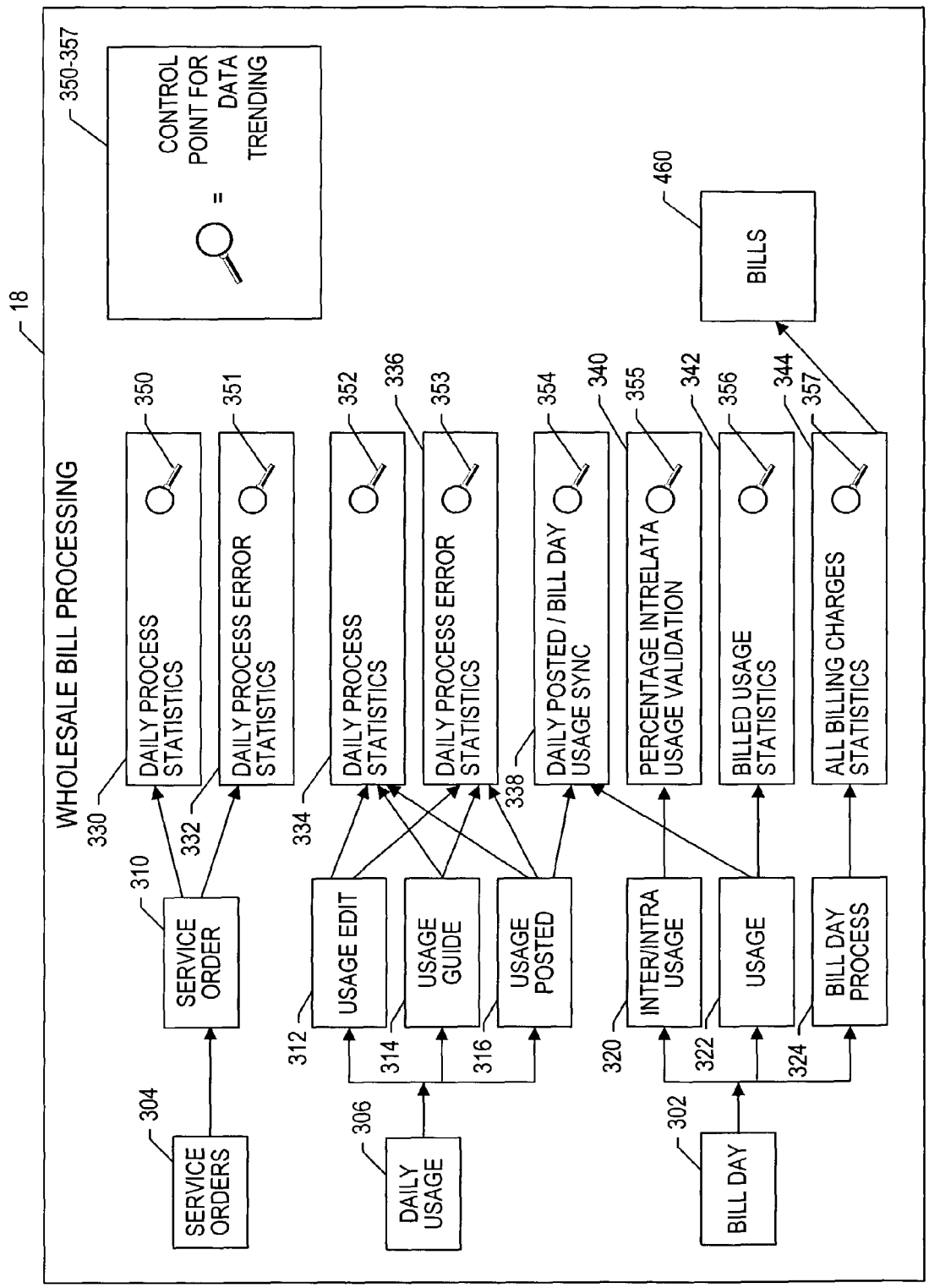
FIG. 3 is a block diagram that illustrates further details of an illustrative wholesale bill processing system.

Referring to FIG. 3, an illustrative embodiment of a wholesale bill processing module 18 is shown. The wholesale bill processing module 18 includes service order module 310, usage modules 312, 314, 316, and bill day related modules 320, 322, 324. The wholesale bill processing system 18 includes a plurality of statistics modules such as the illustrative statistics modules 350 to 357, as shown.

During operation, a service order 304 is processed by the service order module 310 and the processed service order is fed to a first statistics module 350 and to a second statistics module 351. The first statistics module 350 performs daily process statistics and the second statistics module 351 performs daily process error statistics.

Additional statistics modules performing process statistics and error statistics in response to the usage modules 312, 314, 316 are illustrated in FIG. 3 as modules 352, 353 and 354. Additional statistics built modules for billed usage data 356, percentage intrelata usage validation data 355, and for handling billing charge statistics 357 are also illustrated and are used to process data from the bill date modules 320, 322, 324. The final bill 460 from the wholesale bill processing module is produced by the billing charge statistics module 357. Within the bill processing period of processing aggregated data from the wholesale bill processing module, there are various control points suitable for data trending, as illustrated within statistics modules 350 to 357. Each of these control points may be used as data extraction points to retrieve rated billing data for processing by the early warning billing monitoring, and reporting system 50.

Figure 4:
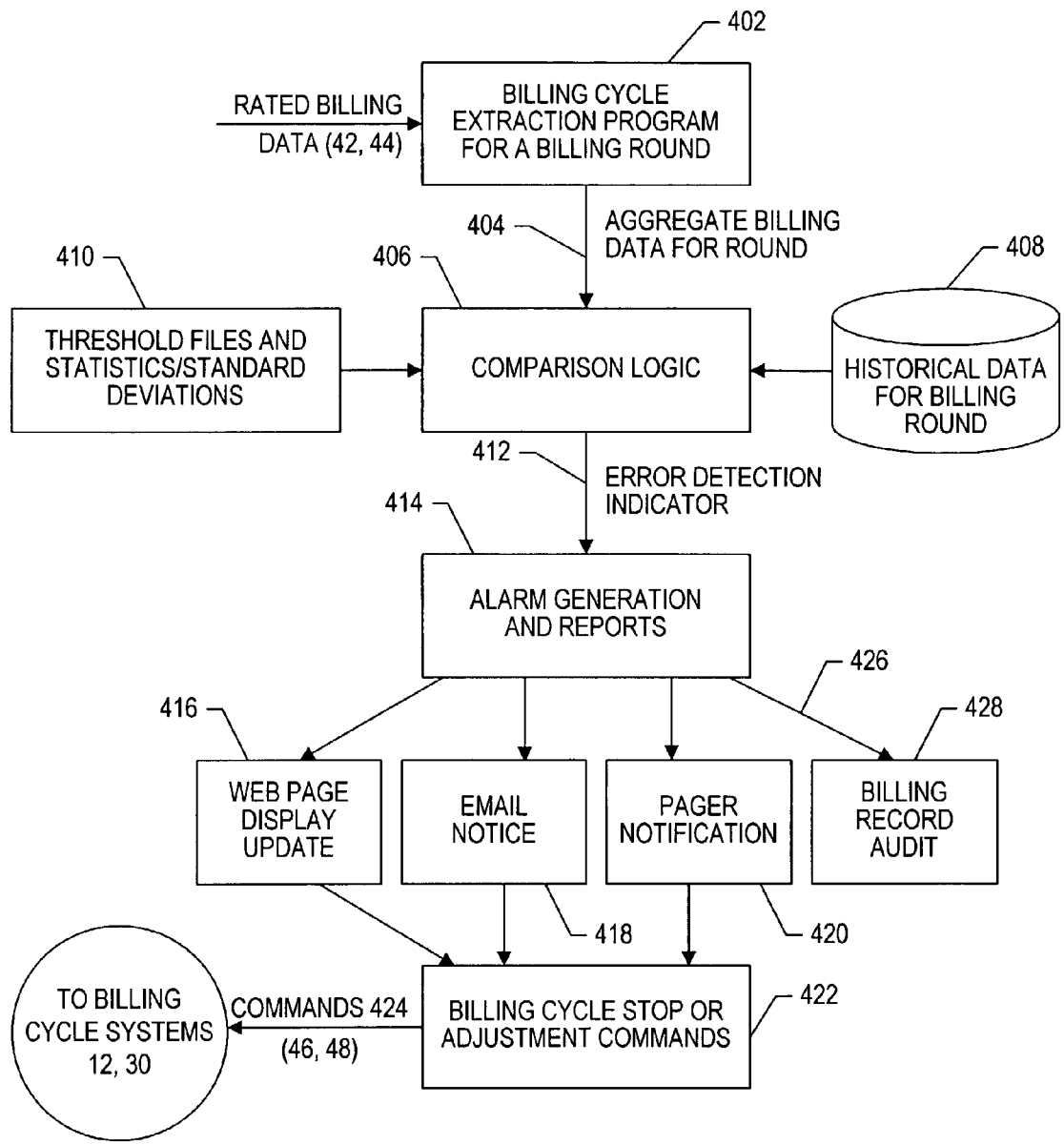
FIG. 4 is a flow chart that illustrates operation at the early warning billing, monitoring, and reporting system.

Referring to FIG. 4, a method of extracting billing data and processing such data within the early warning billing, monitoring, and reporting system 50 is illustrated. A billing cycle extraction program for a billing round 402 receives rated billing data such as billing data 42, 44 from the retail and wholesale billing systems. Aggregate billing data for the particular billing round is then fed to comparison logic 406. The comparison logic receives threshold files, statistics and standard deviations 410 and historical data for that billing round 408. Based on the comparison between the aggregate billing data for the round and the historical data and statistics threshold files an error detection indicator may be produced. The error detection indicator 412 identifies the potential error in billing data in response to the comparison logic 406. An alarm generation and reporting unit 414 in response to a detected error indication 412, produces various types of alarms and reports.

For example, a web-page display may be updated 416, e-mail notice may be sent 418, and a pager notification may be sent 420. A billing record audit 428 is recorded for later tracking of detected alarm conditions. In addition to detecting and reporting potential errors, billing commands may also be generated. For example, the billing cycle stop or adjustment command 422 may be determined and communicated to the billing systems 12, 30. The billing command is sent using a command signal 424 to the respective wholesale or retail bill processing system.

Figure 5:
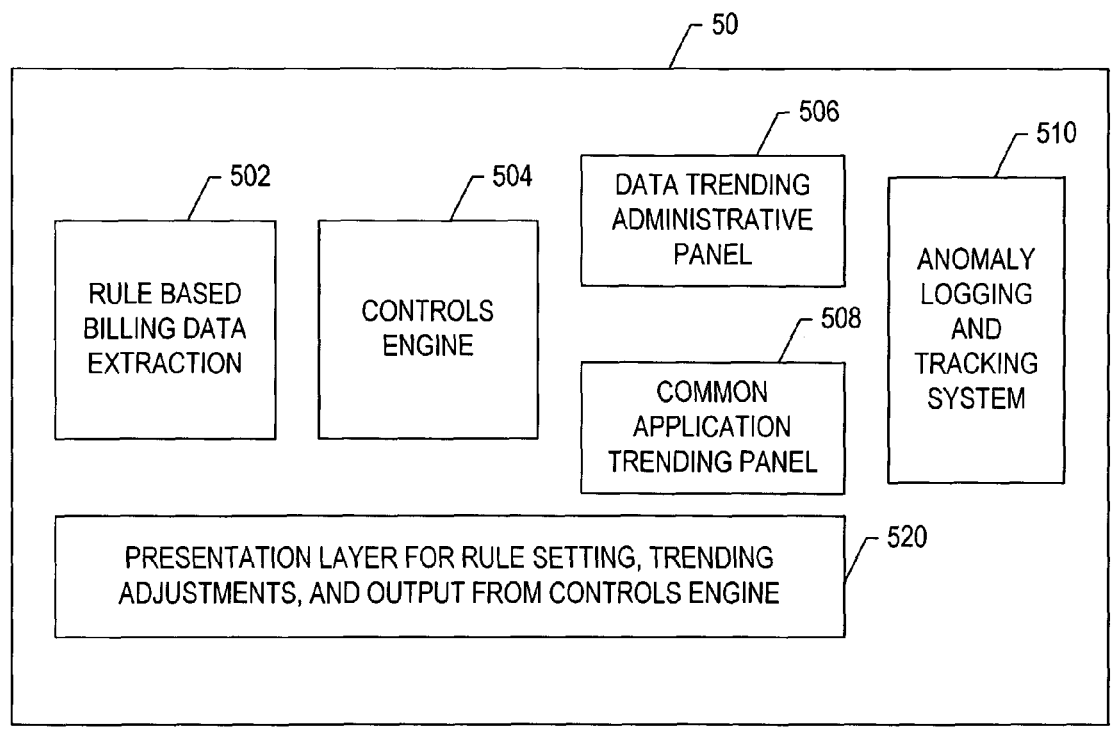
FIG. 5 is a general diagram that illustrates functionality of the early warning billing, monitoring, and reporting system.

Referring to FIG. 5, further details of the functionality of the early warning billing, monitoring, and reporting system 50 is shown. The early warning system 50 includes a rule-based billing data extraction module 502, a processing control engine 504, a data trending administrative panel 506, common application trending panel 508, and an anomaly logging and tracking system 510. The early warning system 50 also includes a presentation layer to perform rule setting, trending adjustments and output from the controls engine. The presentation layer is identified in module 520.

Figure 6:
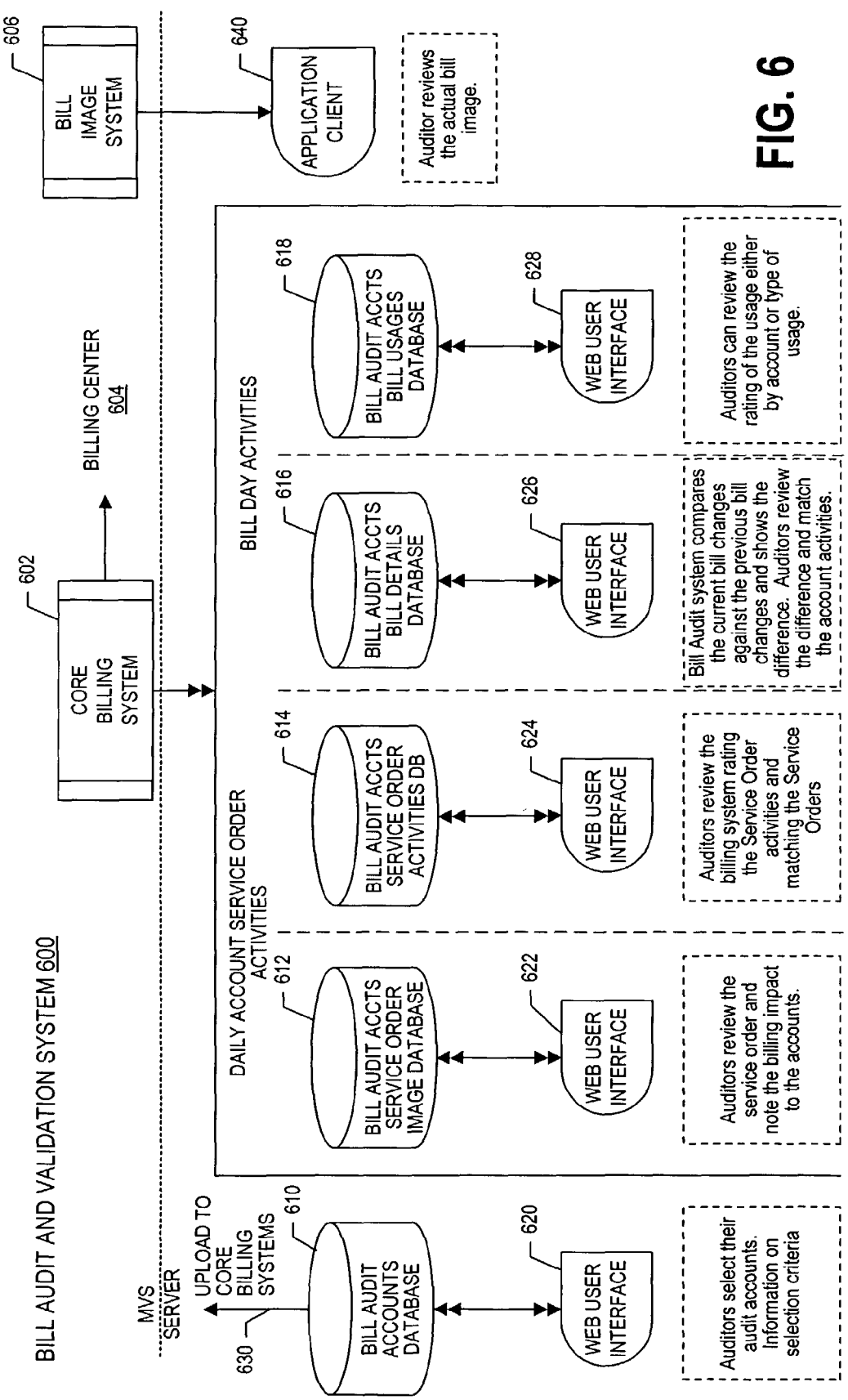
FIG. 6 is a general diagram that illustrates a bill audit and validation system.

Referring to FIG. 6, an illustrative system for performing bill auditing and validation on an individual billing basis is shown. A bill audit and validation system 600 includes a core billing system 602 and a bill image system 606. Certain activities within the bill audit validation system are performed remotely as indicated by elements performed within the core billing system 602 and the bill image system 606, and additional activities performed within a server as shown in FIG. 6. The bill audit and validation system 600 at the server also includes a bill audit accounts database 610, a daily account service order activities, and bill day activities. The bill audit accounts database 610 has a web user interface 620 and allows auditors to select their audit accounts and provides information on user selected criteria. The bill audit accounts database 610 produces a core billing system upload 630. The daily account service order activities include bill audit account service order image database 612 and the bill audit account service order activities database 614. The bill audit account service order image database 612, via web interface 622, allows auditors to review service orders and to note the billing impact to various accounts as applicable. The bill audit account service order activity database 614, via web user interface 624, allows auditors to review the billing system rating of the service order activities and to match these activities with the particular service order.

Bill day activities include a bill audit accounts bill details database 616 and a bill audit accounts bill usage database 618. The bill audit accounts bill details database 616, via web user interface 626, compares current bill charges against the previous bill charges and shows that difference. Auditors may review the bill differences and match account activities. The bill audit accounts bill usage database 618, via web user interface 628, allows auditors to review a bill rating of the usage either by account or type of usage. An application client module 640 allows auditors to review a bill image which is received from bill image system 606. With the bill audit and validation system 600, an auditor may review detailed billing records on an image basis and related data using various other views, thereby conducting a micro-level bill audit. A micro-level bill audit may be triggered when the aggregate billing data run indicates an error or some other kind of alarm report. In addition, the micro-level bill audit and validation system 600 may be used either randomly as a spot check of various billing records or may be a forensic tool to perform root cause analysis where aggregate billing data problems are identified.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of processing billing data in a billing data processing system having a data processor, a memory for storing data, and an interface coupled to a first billing system, the method comprising:
    extracting a first set of rated aggregated billing data from the first billing system at a first point within the first billing system during a billing period;
    storing the first set of rated aggregated billing data in the memory;
    extracting a second set of rated aggregated billing data from the first billing system at a second point within the first billing system during the billing period, wherein the first point and the second point are different data extraction points in the first billing system;
    processing the first set of rated aggregated billing data and the second set of rated aggregated billing data;
    determining a billing warning event based on processing the first set of rated aggregated billing data and the second set of rated aggregated billing data;
    providing notification of the billing warning event; and
    initiating a billing audit on a subset of bills within a billing round in response to the billing warning event.

2. The method of claim 1, further comprising extracting a third set of rated aggregated billing data at a third point in the first billing system during the billing period.

3. The method of claim 2, wherein the first point in the first billing system is an output of a service order processing module and the second point in the first billing system is an output of a usage processing module.

4. The method of claim 3, wherein the third point in the first billing system is an output of a bill calculation module and wherein the output of the bill calculation module is extracted prior to generation of final bills by the first billing system.

5. The method of claim 1, wherein the first set of rated aggregated billing data is derived from telephony time-based usage data produced by a telephony network.

6. The method of claim 5, wherein the telephony time-based usage data is minutes of use data and wherein the first set of rated aggregated billing data is determined by application of a per minute billing rate to the minutes of use data.

7. The method of claim 1, wherein the step of processing the first set of rated aggregated billing data and the second set of rated aggregated billing data comprises comparing the first set of rated aggregated billing data and the second set of rated aggregated billing data to historical data associated with prior processing of the billing data processing system and with respect to a predetermined threshold.

8. The method of claim 7, wherein the step of processing further comprises performing statistical analysis on the first set of rated aggregated billing data.

9. The method of claim 1, wherein the billing period is associated with a billing round that is associated with greater than four hundred thousand individual telephone subscriber bills.

10. The method of claim 1, wherein the step of processing includes determining a selected subset of highest bills based on a total amount due and comparing the selected subset with historical data.

11. The method of claim 1, wherein the notification of the billing warning event is provided by at least one of email, pager, and screen display.

12. The method of claim 1, further comprising initiating a billing system command in response to the billing warning event.

13. The method of claim 12, wherein the billing system command is one of a billing period stop command and a billing period adjustment command.

14. The method of claim 13, wherein the first billing system stops the billing period in response to receiving the billing period stop command.

15. A method of processing rated billing data within a billing data extraction and processing system during a billing period, the method comprising:
    extracting a first set of rated aggregated billing data at a first point within a bill processing system for a billing round, the billing round associated with a plurality of bills;
    storing the first set of rated aggregated billing data in a memory;
    extracting a second set of rated aggregated billing data at a second point within the bill processing system for the billing round; and
    processing the first set of rated aggregated billing data and the second set of rated aggregated billing data to determine a billing event, wherein processing the first set of rated aggregated billing data and the second set of rated aggregated billing data comprises comparing the first and second sets of data to historical data associated with prior processing of the billing round and with respect to predetermined threshold files, determining a billing warning event based on the comparing, transmitting a signal to indicate the billing warning event, and initiating a billing audit on a subset of bills within the billing round in response to the billing warning event, the billing audit occurring prior to generation and distribution of a bill to a subscriber.

16. The method of claim 15, wherein the bill processing system receives data usage information from a telephony system provider.

* * * * *